(12) United States Patent
Yuriy et al.

(10) Patent No.: US 6,688,556 B1
(45) Date of Patent: Feb. 10, 2004

(54) DIMMING DEVICE FOR AN AIRCRAFT WINDOW

(75) Inventors: Logvinenko Yuriy, Kharkiv (UA); Pidpruzhnikov Vladyslav, Kharkiv (UA)

(73) Assignee: Inter AMI Ltd., Kharkiv (UA)

( * ) Notice: Subject to any disclaimer, the term of this patent is extended or adjusted under 35 U.S.C. 154(b) by 0 days.

(21) Appl. No.: 10/148,141

(22) PCT Filed: Aug. 17, 2000

(86) PCT No.: PCT/UA00/00030
§ 371 (c)(1),
(2), (4) Date: May 28, 2002

(87) PCT Pub. No.: WO01/47732
PCT Pub. Date: Jul. 5, 2001

(30) Foreign Application Priority Data

Dec. 23, 1999 (UA) .......................................... 99127024

(51) Int. Cl.$^7$ ................................................. B64C 1/14
(52) U.S. Cl. .................... 244/129.3; 160/208; 160/209; 296/97.11
(58) Field of Search ....................... 244/129.3; 160/208, 160/209, DIG. 2; 296/97.11

(56) References Cited

U.S. PATENT DOCUMENTS

| | | | |
|---|---|---|---|
| 3,691,686 A | * | 9/1972 | Donegan .......................... 49/56 |
| 5,044,578 A | | 9/1991 | White et al. .................. 244/119 |
| 5,060,448 A | | 10/1991 | Krapf et al. ................... 52/732 |
| 5,280,686 A | * | 1/1994 | Davies .......................... 49/209 |
| 5,515,898 A | * | 5/1996 | Alcocer .................... 160/84.02 |
| 5,634,682 A | * | 6/1997 | Young ......................... 296/97.8 |
| 6,086,133 A | * | 7/2000 | Alonso ....................... 296/97.8 |

FOREIGN PATENT DOCUMENTS

| | | |
|---|---|---|
| DE | 3435340 | 4/1986 |
| DE | 3835891 | 4/1990 |
| RU | 2052626 | 1/1967 |
| RU | 498211 | 1/1976 |
| RU | 623762 | 8/1980 |
| RU | 1770161 | 10/1992 |
| RU | 2036293 | 5/1995 |
| RU | 2069943 | 12/1996 |
| RU | 2118439 | 8/1998 |
| RU | 2128939 | 4/1999 |
| WO | 9107295 | 5/1991 |

* cited by examiner

Primary Examiner—J. Woodrow Eldred
(74) Attorney, Agent, or Firm—Elliott N. Kramsky

(57) ABSTRACT

The invention relates to transport techniques and can be used for protecting passengers and a pilot in a cabin of an aircraft or another transport means against intense light, in addition to an auxiliary arrangement for moving mobile furniture elements.

The dimming device comprises a blind and a mechanism for moving the blind, including guides for translational displacement of the blind and axial connecting elements of said mechanism. Intermediate non-rigid elements like, for example, a self-adhesive gearing band are arranged between contacting surfaces of the blind and the guides.

The device ensures smooth displacement of the blind by means of decreasing friction force between the contacting elements and reduces noise occurring while the device is in use.

2 Claims, 1 Drawing Sheet

DIMMING DEVICE FOR AN AIRCRAFT WINDOW

THE FIELD OF THE INVENTION

The invention relates to aircraft engineering and transport engineering, particularly to dimming devices for aircraft and other vehicles, and can be used for protecting passengers and a pilot in a cabin of an aircraft or other vehicles against intense light, in addition to an auxiliary arrangement for moving mobile furniture elements.

BACKGROUND OF THE INVENTION

It is known the blind (USSR Inventors Certificate No. 1770161, IPC B60J 1/20, E 06 B 9/56, publ. 23.10.92) comprises flexible canvas, an upper part of which is fixed on a bearing located roller.

A disadvantage of this device is unsmoothed movement of the blind, as well as unreliability thereof during exploitation.

A universal panel of a flight deck side-wall (U.S. Pat. No. 5,044,578, IPC B64D 11/00, B64C 1/14, publ. 03.09.91) is known. It comprises flexible side wall panels and device of fixing thereof to the aircraft frame.

Contacting surfaces of the device, i.e. blind and guides, rub and quickly wear out, that is rather inconvenient in exploitation. Furthermore, movement of the blind in the blind securing device is not smooth because of a big friction force between the surfaces of the blind and the guides due to the lack of a transitional element.

Light collapsible beam of a box section for a free standing display (U.S. Pat. No. 5,060,448, IPC A47B 96/14, publ. 29.10.91) is known. It comprises trough-like sections, equipped with separated parallel plates.

A disadvantage of this device is noise during motion of the movable plates as well as wearing out thereof because of a friction.

The closest to the invention by technical essence, objective and achieved result is a dimming device for an aircraft window (USSR Inventors Certificate No. 498211, IPC B64C 1/14, E06B 9/56, A47H 5/032, publ. 05.01.76) having a blind and a mechanism for moving the blind. The mechanism for moving the blind comprises a roller located on a pin to which the blind is fixed. Lower corners of the blind are connected to the roller by means of a cord.

The disadvantages of this aircraft window dimming device are as follows:

low technological effectiveness of the design manufacturing because of a lot of parts in the mechanism for moving the blind;

low level of the device reliability because of sticking between the device elements, and particularly between the cord and the blind, which are made of flexible material;

poor smoothness of the blind movement because of direct contact between the contacting surfaces, which result in friction sound occurring while the device is in use.

The above-identified disadvantages of the prior art lead to inconvenience during its exploitation and breakage of the device.

DESCRIPTION OF THE INVENTION

The objective of the invention is to increase technological effectiveness of the design manufacturing by decreasing the number of parts of the mechanism for moving the blind.

Another objective is to increase the device reliability by manufacturing the blind out of rigid material, and therefore to exclude a source of sticking between the parts of the mechanism for moving the blind.

Furthermore, objective of the invention is to increase smoothness of the blind movement and exclude noise occurring while the device is in use, by means of arranging an intermediate non-rigid element like, for example, self-adhesive gearing band between the contacting surfaces of the blind and the guards.

These objectives are solved in that the mechanism for moving the blind contains guides for translational displacement of the blind, axial connecting elements of the mechanism for moving the blind, wherein intermediate non-rigid elements like, for example, a self-adhesive gearing band are arranged between contacting surfaces of the blind and the guides.

The device provides increasing of the technological effectiveness of the design manufacturing due to the fact, that the mechanism for moving the blind having less parts, namely, the intermediate element like self-adhesive gearing band, the blind guides and axial connecting elements of the mechanism for moving the blind.

The device provides increasing reliability because the elements of the mechanism for moving the blind are immovable during exploitation, thereby excluding the effect of sticking. The blind is manufactured out of rigid material, and there is no necessity to roll the blind up and down, so it moves only onward or backward in the guides to shut or open the window. Its surfaces contact with the corresponding surfaces of the guides through non-rigid intermediate elements, like self-adhesive gearing band.

The smoothness of the blind motion is increased due to arranging the intermediate non-rigid elements, like self-adhesive gearing band, between the surfaces of the blind and the guides, which provides decreasing the friction between said surfaces and ensures convenience of exploitation. The friction force is required only for fixing the blind in the required opening position.

Arranging the intermediate non-rigid elements results in excluding the noise while opening or shutting the blind. In other words, one will hear only pleasant rustling noise during the blind movement.

Figure 1:
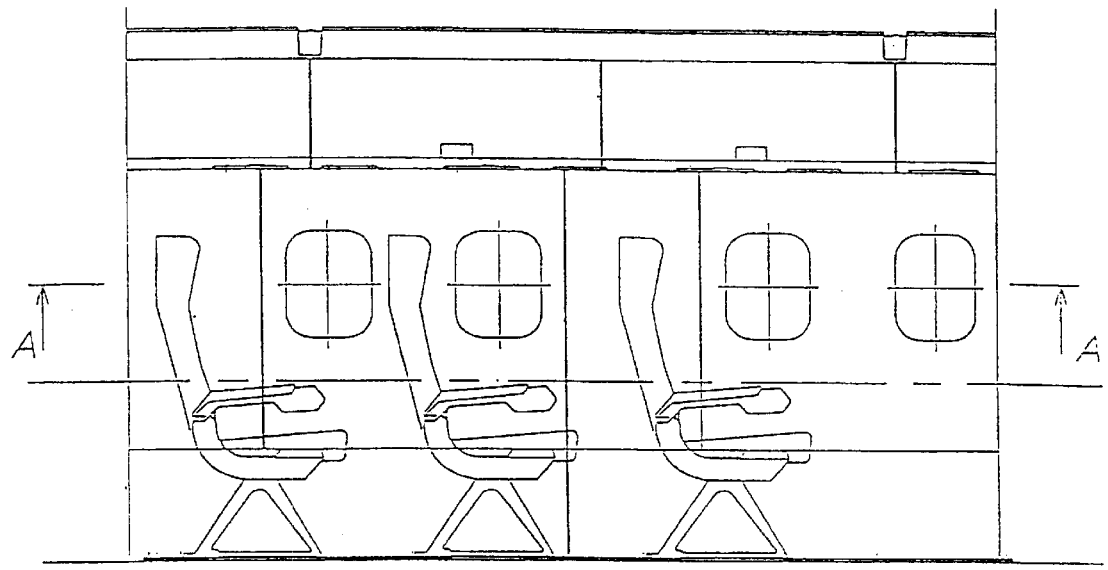
FIG. 1 shows a general view of the blind in the widow side panel of an aircraft.
Figure 2:
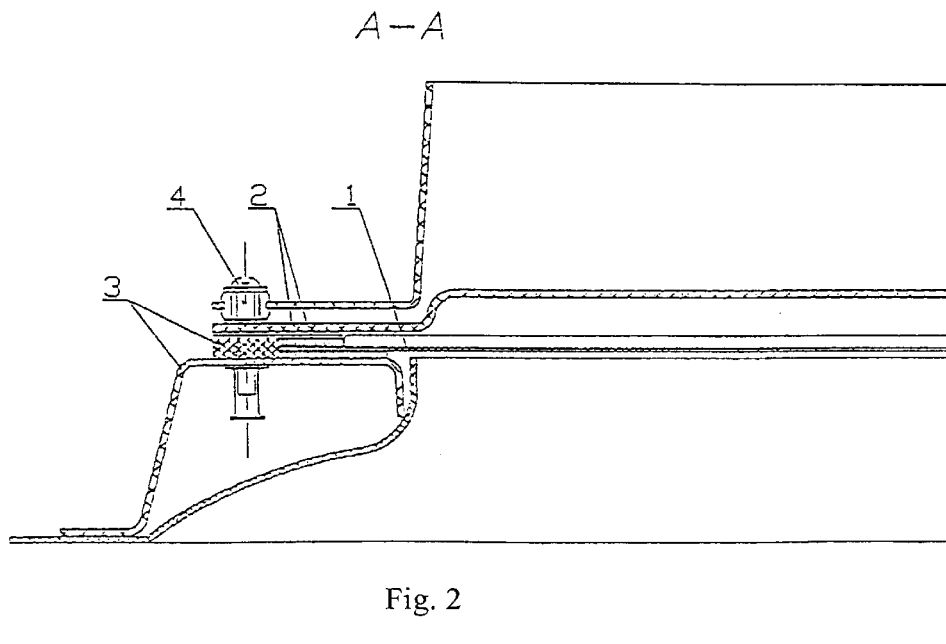
FIG. 2 shows cross-section A—A.

The dimming device contains a blind 1 and device for its moving, which is composed of intermediate non-rigid elements 2, like self-adhesive gearing band, fixed on the guides 3, and axial connecting elements 4, which connects the elements of the mechanism for moving the blind.

The device works in the following manner. When the blind 1 is moved in guides 3 the intermediate non-rigid elements 2 provide a friction force, sufficient to hold the blind 1 in the required position of opening.

Axial connecting elements 4 serves for tightening of the moving elements, and thereby to ensure the necessary gap between the guides 3. The size of the gap is settled during the mounting of the elements inside the mechanism for moving the blind.

INDUSTRIAL APPLICABILITY

The device is industrially applicable and could be used for protecting passengers and a pilot in a cabin of an aircraft or other vehicle against intense light, as well as to serve as an auxiliary arrangement for moving mobile furniture elements. Further, the invention could be used in equipment of vehicles, like sun screens with mirrors, equipped with horizontally movable blinds for opening and shutting.

THE PREFERRED EMBODIMENT

The best application of the device is inside the aircraft cabin to protect passengers against undesirable sunlight. The device life time is increased due to arranging of the intermediate non-rigid elements which decrease a friction force between the contacting surfaces of the blind and the guides, and therefore, prevent the abrasion of the rubbing surfaces. The device is more convenient in use because of reducing of the noise occurring during motion of the blind.

What is claimed is:

1. A dimming device for an aircraft window comprises a blind and a mechanism for moving the blind, characterized in that the mechanism for moving the blind contains guides having planar regions arranged in spaced relationship for translational displacement of the blind, intermediate non-rigid elements between surfaces of the blind and the guides and connecting elements for adjustably applying force between said planar regions of said guides.

2. A dimming device for an aircraft window as defined in claim 1 wherein said non-rigid elements comprise a self-adhesive gearing band.

* * * * *

UNITED STATES PATENT AND TRADEMARK OFFICE
CERTIFICATE OF CORRECTION

| | | |
|---|---|---|
| PATENT NO. | : 6,688,556 B1 | Page 1 of 1 |
| APPLICATION NO. | : 10/148141 | |
| DATED | : February 4, 2004 | |
| INVENTOR(S) | : Yuri Logvinenko and Vladislav Pirpruzhnikov | |

It is certified that error appears in the above-identified patent and that said Letters Patent is hereby corrected as shown below:

Title page item [75]
Correct in Headings as Follows:

Delete Yurily et al. and replace with Logvinenko et al.

Correct inventors names as follows:

Delete Logvinenko Yuriy and replace with Yuriy Logvinenko

Delete Pidpruzhnikov Vladyslav and replace with Vladislav Pidpruzhnikov

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,688,556 B1
APPLICATION NO. : 10/148141
DATED : February 10, 2004
INVENTOR(S) : Yuri Logvinenko and Vladislav Pirpruzhnikov It is certified that error appears in the above-identified patent and that said Letters Patent is hereby corrected as shown below:

Title page item [75]
Correct in Headings as Follows:

Delete Yurily et al. and replace with Logvinenko et al.

Correct inventors names as follows:

Delete Logvinenko Yuriy and replace with Yuriy Logvinenko

Delete Pidpruzhnikov Vladyslav and replace with Vladislav Pidpruzhnikov

This certificate supersedes Certificate of Correction issued April 17, 2007.

Signed and Sealed this

Fifth Day of June, 2007

JON W. DUDAS
*Director of the United States Patent and Trademark Office*